United States Patent [19]

Norton

[11] Patent Number: 4,574,928
[45] Date of Patent: Mar. 11, 1986

[54] COUPLING WITH ONE-WAY PIVOTED PAWL CLUTCHES FOR DRIVE SHAFT AND SERVOMOTOR DRIVEN SHAFT

[76] Inventor: Peter Norton, 15612 Hilton, Southfield, Mich. 48075

[21] Appl. No.: 533,443

[22] Filed: Sep. 19, 1983

[51] Int. Cl.⁴ .............................................. F16D 41/04
[52] U.S. Cl. .................. 192/48.92; 192/43.1
[58] Field of Search ..................... 192/48.92, 48.1, 51, 192/48.91, 43.1, 43.2, 46, 56 R

[56] References Cited

U.S. PATENT DOCUMENTS

| | | | |
|---|---|---|---|
| 2,818,950 | 1/1958 | Harless | 192/48.92 |
| 3,511,348 | 5/1970 | Jonsson et al. | 192/43.1 |
| 4,164,191 | 8/1979 | Peterson | 192/48.92 |
| 4,262,786 | 4/1981 | Taylor | 192/48.92 |
| 4,458,795 | 7/1984 | Norton | 192/43.2 |

Primary Examiner—George H. Krizmanich
Attorney, Agent, or Firm—Reising, Ethington, Barnard, Perry & Milton

[57] ABSTRACT

A mechanical coupling for a power steering system and the like having a driven member reversibly rotated by a servo-motor in response to either clockwise or counter-clockwise rotation of a control member, with the coupling normally connecting the motor to the driven member through a drive transmitting member. In the event of any failure of the motor to rotate the driven member synchronously with the control member, as for example, due to an electrical power failure, rotation of the control member relative to the driven member causes the coupling to disconnect the drive transmitting member and thereby disconnect the motor from the driven member to prevent transmission of torque in the direction opposite to the torque applied by the control member and simultaneously mechanically couple the control member to the driven member for direct drive. During that time, the coupling continues to connect the drive transmitting member to the driven member for transmission of torque in the direction of the torque applied by the control member. An improved drive transmitting coupling is disclosed which comprises a lost motion connection between the control member and the driven member with first and second one-way clutches for coupling the driven member with the drive transmitting member. Each of the clutches includes a set of pivoted pawls mounted on the driven member for driving engagement with the drive transmitting member for driving the driven member in one direction and a set of actuating members mounted on the driven member for disengaging the respective pawls in response to rotation in the opposite direction of the control member relative to the driven member.

14 Claims, 6 Drawing Figures

COUPLING WITH ONE-WAY PIVOTED PAWL CLUTCHES FOR DRIVE SHAFT AND SERVOMOTOR DRIVEN SHAFT

BACKGROUND OF DISCLOSURE

This invention relates to a coupling for interconnecting a control shaft, a driven shaft and a servo-motor which normally powers the driven shaft. This coupling is particularly useful in an automotive vehicle power steering system. It is an improvement on my invention set forth in my prior patent application U.S. Ser. No. 392,993, filed June 28, 1982 now U.S. Pat. No. 4,458,795 entitled "COUPLING FOR DRIVE SHAFT AND SERVO-MOTOR DRIVEN SHAFT"

In general, a power steering system for an automotive type vehicle includes a control shaft or steering column which is controlled by the vehicle operator turning the steering wheel, and a power assist device for the driven steering system. Hydraulic devices are conventionally used to provide the power assist. In addition, it is known to use a servo-motor arrangement to provide the power assist for the drive. An example of the use of a servo-motor arrangement is disclosed in U.S. Pat. No. 3,893,534 issued July 8, 1975 to Steinmann.

In any power assist device used in a power steering system, there is a danger of malfunctioning or power failure. Although failures are rare, it is necessary to provide a direct drive alternative to the power assist drive during times of malfunctioning or failure. When the servo-motor resists or opposes the action of the driver, the servo-motor should be disengaged, whereas it should remain engaged if it provides some assistance even though it may be in a state of partial failure. Before my invention set forth in U.S. Ser. No. 392,990, systems lacked these qualities to some degree or had other deficiencies which kept them from achieving commercial success.

Thus, this invention describes an improved coupling which provides a fail-safe connection between the servo-motor power source and the control and driven shafts or members to allow a direct drive in the event of power failure. During such direct drive the servo-motor power source is prevented from interfering with, but is allowed to assist the direct drive.

SUMMARY OF THE INVENTION

In accordance with this invention, an improved one-way clutch means is provided for a drive transmitting coupling for coupling a control member and a drive transmitting member with a driven member, the clutch means being operative for coupling the drive transmitting member with the driven member for transmitting driving effort in either direction but being disengageable by response to relative movement of the control member with respect to the driven member whereupon a lost motion means operatively engages the control member with the driven member for direct drive. This is accomplished by first and second one-way clutches having, respectively, first and second sets of pawls which are pivotally mounted on the driven member. First and second sets of actuating members are mounted on the driven member for disengaging the first and second sets of pawls, respectively, from driving engagement with the drive transmitting member in response to relative movement of the control member with respect to the driven member.

Further, in accordance with this invention, the control member is operatively engageable with the first and second sets of actuating members in a lost motion travel relative to the driven member.

Further, in accordance with this invention, the driven member comprises an annular body with a set of radially inwardly extending abutment members all mounted upon a support member. The control member includes an actuator head extending between the abutment members and having a set of radially outwardly extending teeth adapted to engage the abutment members for providing a lost motion connection and adapted to operatively engage the actuating members. The drive transmitting member comprises a ring gear having a set of internal ratchet teeth adapted to be engaged by the first and second sets of pawls. Each of the ratchet teeth is symmetrical about a radius line of the ring gear. Each of the actuating members is a lever in pivotal engagement with its respective pawl and with the driven member. The pawls and levers of the first and second sets are alternately disposed in a circumferential direction around the driven member and spring means acts between the adjacent levers for urging the respective pawls toward rotation in opposite directions. Each of the levers includes an arm extending into the path of the teeth on the actuating member whereby the first and second sets of levers are actuated to disengage the first and second sets of pawls, respectively, on relative rotation of the control member with respect to the driven member.

A more complete understanding of this invention may be obtained from the detailed description that follows taken with the accompanying drawings.

BEST MODE FOR CARRYING OUT THE INVENTION

Figure 1:
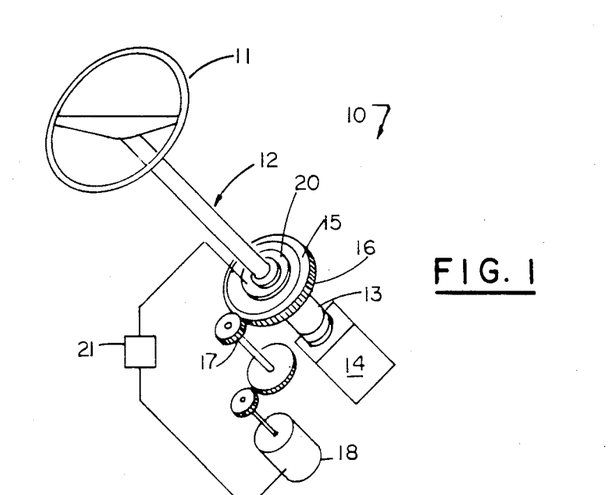
FIG. 1 is a schematic, generally perspective, view of an automotive steering system showing the general application of the coupling.

FIG. 1 schematically illustrates an automobile steering system 10 which, in general, comprises a manually operable steering wheel 11 mounted upon a control shaft 12. The control shaft operates a driven shaft 13, which connects to and actuates a conventional steering gear mechanism 14. Such steering gear mechanisms generally comprise appropriate gears, linkages, etc., for turning the vehicle's front wheels in response to the manual turning of the steering wheel.

Mounted upon the driven shaft 13 is a coupling block 15. A ring gear 16 is rotatably mounted upon the peripheral surface of the coupling block. This ring gear is driven by a gear train 17 connected to a reversible servo-motor 18.

When the steering wheel 11 rotates the control shaft 12, a sensing device 20, which is schematically shown, senses the relative angular movement of the control shaft with respect to the driven shaft. The sensing device signals and controls, through an appropriate amplifier control system 21, the synchronous operation of the servomotor. The particular type of sensor selected is within the skill of the art and forms no part of the invention. Likewise, the amplifier control system, drive train and servo-motor are also conventional. Thus, these components are illustrated only schematically.

Figures 3, 6:
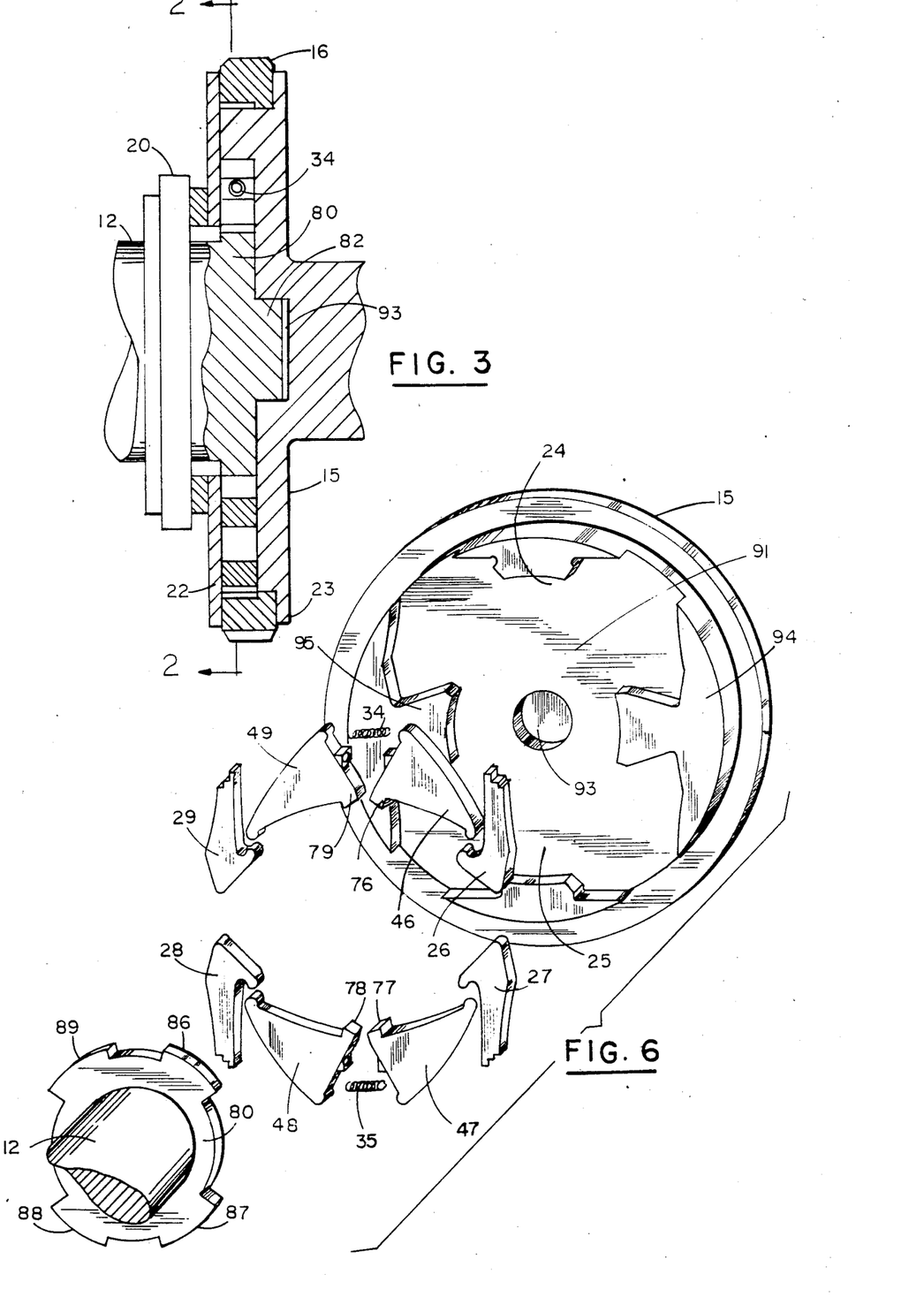
FIG. 3 is a cross-sectional view taken in the direction of arrows 3—3 of FIG. 2.
FIG. 6 is a disassembled view of the coupling block, pawls, actuating members and the actuator end of the control shaft, showing the relationship between these parts.

As shown in FIG. 3, the ring gear 16 is maintained in position upon the coupling block by suitable lips or flanges, such as flange 23 formed on one edge of the coupling block. Other suitable guides (such as the cover plate 22 shown) may be provided to properly position the gear.

Figure 2:
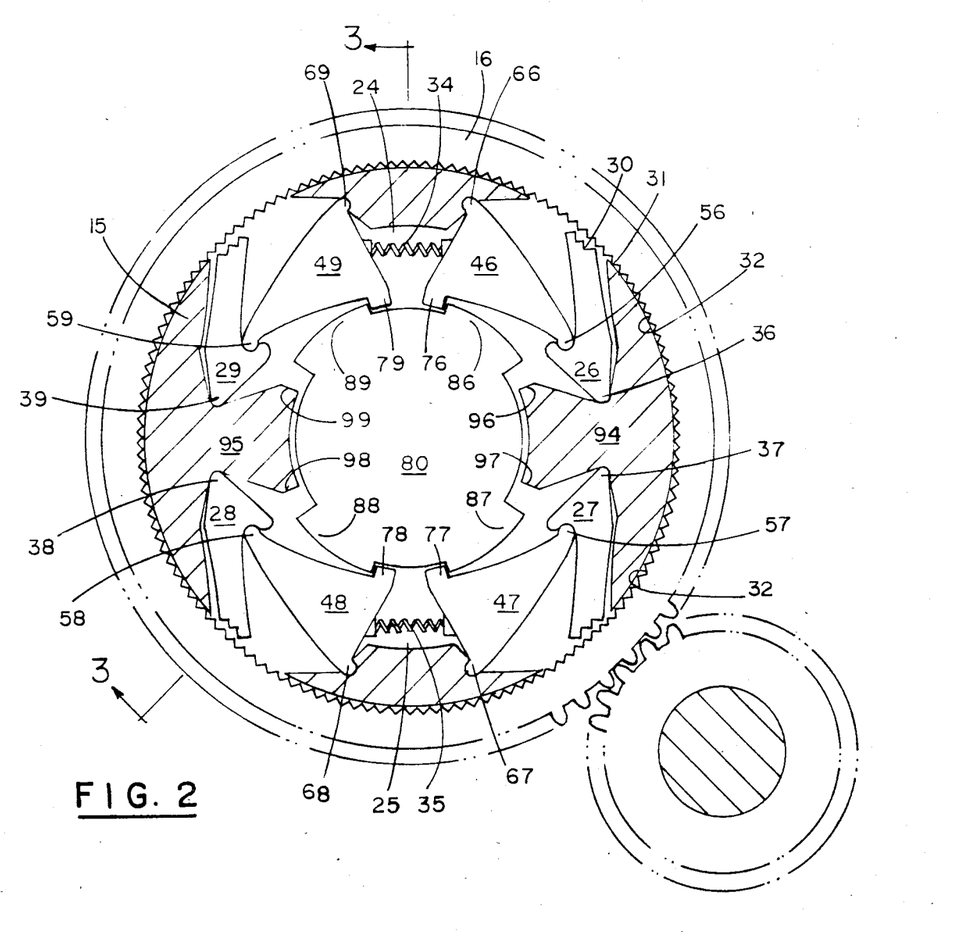
FIG. 2 is an end view of the control shaft and coupling block, taken in the direction of arrows 2—2 of FIG. 3.

Referring to FIG. 2, the coupling block is an annular member and includes two opposing compartments 24 and 25 which are separated by internal, diametrically opposed abutments or stop flanges 94 and 95. Elongated pawls 26, 27, 28 and 29 are rotatably fitted within the compartment to pivot about axes 36, 37, 38 and 39, respectively. There are two pairs of opposed pawls 26 and 27, and 28 and 29.

The outer end of each pawl is formed with a flat end to engage teeth 31 and fit into triangular notches 32 which are formed on the inside surface of the ring gear 16. Each tooth 31 is symmetrical about a radius line of the ring gear. As can be seen in the drawings, the notches are equally spaced along the surface of the gear so that the pawls engage which ever notches are adjacent to them at any particular time. The pawls operate as unidirectional connectors. That is, the pawls 26 and 28 positively lock the coupling block 15 and gear together for rotation in one direction but release, in a ratchet-like action, in the event of opposite relative rotation of the gear upon the coupling block. Conversely, the pawls 27 and 29 unidirectionally positively lock the gear to the coupling block for rotation in a direction opposite to that mentioned above. Equally, these pawls release in a ratchet-like manner, where the rotational direction is reversed. Consequently, it can be seen that by retracting pawls 26 and 28, or alternatively, pawls 27 and 29, the gear 16 will be locked upon the coupling block for drive in one direction, but will slip or rotate should the drive direction be reversed. Intermediate actuators 46, 47, 48 and 49 engage pawls 26, 27, 28 and 29 at pivots 56, 57, 58 and 59 while pivoting about axes 66, 67, 68 and 69.

Springs 34 and 35 urge the intermediate actuators outwardly thereby urging the pawls into engagement with their adjacent triangular notches. Conventional coil springs may be used or alternatively, leaf springs can be used. Thus, the pawls are normally extended outwardly into locking positions.

The pawls and intermediate actuators are preferably sized so that at the point in their motion where the pivots 56, 57, 58 or 59 lie on straight lines connecting respectively axes 36, 37, 38 or 39 to axes 66, 67, 68 or 69 there is a close fit with little free play. By design this position can be made to be the half way point between the extremes of motion of the pawls and intermediate actuators and by so doing and by virtue of the small angles through which the actuators and pawls rotate the free play can be made small at all positions of the pawls and intermediate actuators.

Referring to FIGS. 3 and 6 the control shaft 12 has an end located within the coupling block. Central actuator 80 is formed on or attached to this end and extends transversely to the axis of the shaft. This central actuator fits into a central recessed portion 91 located between the coupling block internal stop flanges 94 and 95.

Referring to FIGS. 2, 3 and 6 the control shaft end 82 rotatably fits within a socket 93 formed within the coupling block. Thus the central actuator 80 is positioned transversely of the axes of the drive and driven shafts and between the inner surfaces of the stop flanges 94 and 95.

The central actuator 80 is formed with teeth 86, 87, 88 and 89 which engage tabs 76, 77, 78 and 79 formed in the respective intermediate actuators 46, 47, 48 and 49. Consequently, rotation of the control shaft relative to the coupling block in one direction causes the teeth 86 and 88 of actuator 80 to engage the tabs 76 and 78 of the intermediate actuators 46 and 48 causing them to rotate and thereby causing pawls 26 and 28 to rotate out of their engaged positions. Rotation of the control shaft relative to the coupling block in the other direction causes the teeth 87 and 89 to engage the tabs 77 and 79 of the intermediate actuators 47 and 49 causing them to rotate and thereby causing pawls 27 and 29 to rotate out of their engaged positions.

Operation

Figures 4, 5:
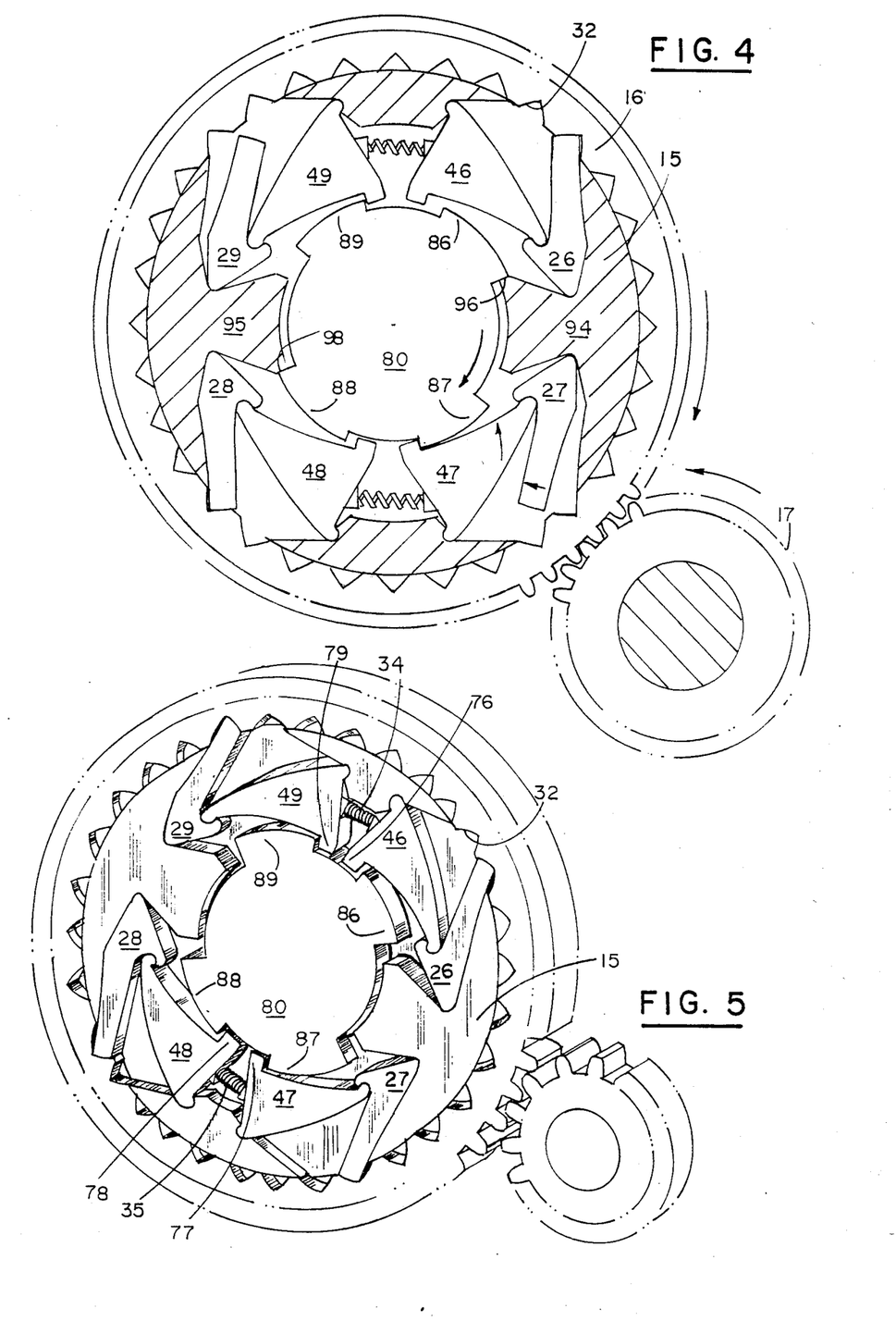
FIG. 4 is a view similar to FIG. 2, but illustrating the actuating members retracting certain of the pawls with the control shaft being in direct drive position.
FIG. 5 is a perspective view of the clutch assembly.

In normal operation, the coupling parts are located as illustrated in FIGS. 2 and 5. The teeth 86, 87, 88 and 89 of central actuator 80 do not contact tabs 76, 77, 78 and 79. The springs 34 and 35 through intermediate actuators 46, 47, 48 and 49 force the flat ends of pawls 26, 27, 28 and 29 outwardly into seating engagement with triangular notches 32 in the ring gear. Consequently, the pawls positively lock the ring gear to the coupling block for rotation together in either a clockwise or counterclockwise direction.

During this normal operation, the driver turns the steering wheel 11 either clockwise or counterclockwise. The sensor 20 senses the turning movement and transmits a signal to the amplifier and control system 21 which in turn controls the servo-motor 18. Thus, the motor operates in response to the turning of the steering wheel and control shaft and transmits power through the gear train 17 to the ring gear 16. The ring gear 16, due to the power assist from the motor, rotates synchronously with the control shaft to rotate the coupling block. When the driven shaft 13 is rotated, it operates the conventional steering gear box 14 for steering the vehicle in the conventional manner.

In the event of a power failure or malfunction of the servo motor, sensor, amplifier or gear train, etc., the coupling operates to directly couple the control shaft to the driven shaft and to disengage any power assist applied in a direction counter to the desired direction.

Referring to FIG. 4, assuming a partial power failure, rotation of the steering wheel 11 in a clockwise direction causes the central actuator 80 to rotate into the position shown in FIG. 4. That is, the control shaft and the actuator have rotated angularly a predetermined amount relative to the coupling block. This takes place whenever the power produced by the power assist servo-motor is insufficient or greater than required to keep the coupling block and the drive shaft in synchronism.

The teeth 87 and 89 of the central actuator 80 have rotated the intermediate actuators 47 and 49 to retract the pawls 27 and 29. Hence, the pawls 26 and 28 couple the gear 16 to the coupling block for power assistance in a clockwise direction. However, counterclockwise rotation of the gear 16 upon the coupling block is permitted, first, because the pawls 27 and 29 are withdrawn or retracted and second, because the still operating pawls 26 and 28 will ratchet out of the way relative to the slots 32 on the gear 16 when the gear rotates counterclockwise.

Because the teeth 86 and 88 abut surfaces 96 and 98 of the stop flanges 94 and 95 as illustrated in FIG. 4, there is a solid, direct drive connection between the control shaft 12, through the central actuator 80, to the coupling block for positive drive of the coupling block by the control shaft 12. Thus, there is a lost motion connection between the central actuator 80 and the coupling block 15. To the extent that the power assist system is still able to produce torque, even though at a level insufficient to maintain synchronism, that torque, if applied in the direction of desired rotation (see arrows in FIG. 4), will assist the turning of the coupling block and driven shaft. Conversely, if there is torque applied in the opposing direction, such as due to malfunctioning of the servo-motor, then that torque causes idling rotation of the gear 16 upon the coupling block and the power is not transmitted to the coupling block. Thus, wrongly directed torque does not oppose or interfere with the direct rotational effort of the direct drive of drive shaft 12 to the coupling block.

Rotation of the steering wheel 11 in the opposite, counterclockwise direction, produces a reverse effect to that shown in FIG. 4. Thus, there is a fail-safe coupling which operates independently of any power failure or malfunctioning of the power assist system but which can take advantage of any remaining power so long as it is applied in the direction of rotation.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a drive transmitting coupling for coupling a control member and a drive transmitting member with a driven member said coupling being of the type comprising:
   a lost motion means adapted to couple said control member with said driven member, a first one-way clutch for coupling said drive transmitting member with said driven member for transmitting driving effort in one direction, a second one-way clutch for coupling said drive transmitting member with said driven member for transmitting driving effort in the opposite direction, a first disengaging means for disengaging said first one-way clutch in response to movement of said control member in said opposite direction relative to said driven member, and a second disengaging means for disengaging the second one-way clutch in response to movement of said control member in said one direction relative to said driven member, the improvement wherein:
   said first one-way clutch comprises a first set of pawls pivotally mounted on said driven member for driving engagement with said drive transmitting member,
   and said second one-way clutch comprises a second set of pawls pivotally mounted on said driven member for driving engagement with said drive transmitting member,
   said first and second sets of pawls being operatively coupled with said first and second disengaging means, respectively.

2. The invention as defined in claim 1 wherein,
   said first disengaging means comprises a first set of actuating members operatively engageable with said control member for disengaging said first set of pawls from driving engagement with said drive transmitting member in response to movement of said control member in said opposite direction relative to said driven member,
   said second disengaging means comprises a second set of actuating members operatively engageable with said control member for disengaging said second set of pawls from driving engagement with said drive transmitting member in response to movement of said control member in said one direction relative to said driven member.

3. The invention as defined in claim 1 wherein,

4. The invention as defined in claim 1 wherein,
   said lost motion means comprises a set of radially inwardly extending abutment members on said driven member and a set of radially outwardly extending teeth on said control member adapted to engage said abutment members for providing a lost motion connection therebetween.

5. The invention as defined in claim 1 wherein,
   said drive transmitting member comprises a ring gear having a set of internal ratchet teeth adapted to be engaged by said first and second sets of pawls.

6. The invention as defined in claim 5 wherein each of said ratchet teeth is symmetrical about a radius line of said ring gear.

7. The invention as defined in claim 2 wherein each of said actuating members is a lever in pivotal engagement with its respective pawl and with said driven member.

8. The invention as defined in claim 7 wherein,
   the pawls and levers of said first set are alternately disposed with the pawls and levers of the second set in a circumferential direction around said driven member,
   and spring means acts between adjacent levers for urging the respective pawls toward rotation in opposite directions whereby adjacent pawls engage said drive transmitting member for rotation in both directions.

9. The invention as defined in claim 7 wherein, said control member includes an actuator head having a set of teeth thereon,
   and each of said levers includes an arm extending into the path of said teeth on said actuator head whereby the second set of levers is actuated to disengage the second set of pawls on rotation of the control member relative to the driven member in one direction and the first set of levers is actuated to disengage the first set of pawls on rotation of the control member relative to the driven member in the opposite direction.

10. The invention as defined in claim 1 wherein,
    each pivot comprises a pocket in one of the articulated elements with a surface approximating a segment of a cylinder and a surface on the other of the articulating elements mating with the surface of the pocket.

11. The invention as defined in claim 7 wherein,
the three pivots of each pawl and lever pair are approximately on a straight line whereby free play is minimized.

12. The invention as defined in claim 7 wherein,
each pivot comprises a pocket in one of the articulated elements with a surface approximating a segment of a cylinder and a surface on the other of the articulating elements mating with the surface of the pocket.

13. The invention as defined in claim 2 wherein,
said lost motion means comprises a set of radially inwardly extending abutment members on said driven member and a set of radially outwardly extending teeth on said control member adapted to engage said abutment members for providing a lost motion connection therebetween.

14. The invention as defined in claim 13 wherein,
each of said actuating members is a lever in pivotal engagement with its respective pawl and with said driven member,
and each of said levers includes an arm extending into the path of said teeth on said control member whereby the second set of levers is actuated to disengage the second set of pawls on rotation of the control member relative to the driven member in one direction and the first set of levers is actuated to disengage the first set of pawls on rotation of the control member relative to the driven member in the opposite direction.

* * * * *

UNITED STATES PATENT AND TRADEMARK OFFICE
CERTIFICATE OF CORRECTION

PATENT NO. : 4,574,928                         Page 1 of 3

DATED : March 11, 1986

INVENTOR(S) : Peter Norton

It is certified that error appears in the above-identified patent and that said Letters Patent is hereby corrected as shown below:

TITLE PAGE:

The title page should be deleted to appear as per attached title page.

IN THE DRAWINGS:

Sheet 1, Figure 2 is deleted and the attached Figure 2 is substituted therefor.

Signed and Sealed this

Twenty-first Day of February, 1989

Attest:

DONALD J. QUIGG

*Attesting Officer*                  *Commissioner of Patents and Trademarks*

United States Patent [19]

Norton

[11] Patent Number: 4,574,928
[45] Date of Patent: Mar. 11, 1986

[54] COUPLING WITH ONE-WAY PIVOTED PAWL CLUTCHES FOR DRIVE SHAFT AND SERVOMOTOR DRIVEN SHAFT

[76] Inventor: Peter Norton, 15612 Hilton, Southfield, Mich. 48075

[21] Appl. No.: 533,443

[22] Filed: Sep. 19, 1983

[51] Int. Cl.⁴ ............................................. F16D 41/04
[52] U.S. Cl. .................... 192/48.92; 192/43.1
[58] Field of Search .............. 192/48.92, 48.1, 51, 192/48.91, 43.1, 43.2, 46, 56 R

[56] References Cited

U.S. PATENT DOCUMENTS

| | | | |
|---|---|---|---|
| 2,818,950 | 1/1958 | Harless | 192/48.92 |
| 3,511,348 | 5/1970 | Jonsson et al. | 192/43.1 |
| 4,164,191 | 8/1979 | Peterson | 192/48.92 |
| 4,262,786 | 4/1981 | Taylor | 192/48.92 |
| 4,458,795 | 7/1984 | Norton | 192/43.2 |

*Primary Examiner*—George H. Krizmanich
*Attorney, Agent, or Firm*—Reising, Ethington, Barnard, Perry & Milton

[57] ABSTRACT

A mechanical coupling for a power steering system and the like having a driven member reversibly rotated by a servo-motor in response to either clockwise or counter-clockwise rotation of a control member, with the coupling normally connecting the motor to the driven member through a drive transmitting member. In the event of any failure of the motor to rotate the driven member synchronously with the control member, as for example, due to an electrical power failure, rotation of the control member relative to the driven member causes the coupling to disconnect the drive transmitting member and thereby disconnect the motor from the driven member to prevent transmission of torque in the direction opposite to the torque applied by the control member and simultaneously mechanically couple the control member to the driven member for direct drive. During that time, the coupling continues to connect the drive transmitting member to the driven member for transmission of torque in the direction of the torque applied by the control member. An improved drive transmitting coupling is disclosed which comprises a lost motion connection between the control member and the driven member with first and second one-way clutches for coupling the driven member with the drive transmitting member. Each of the clutches includes a set of pivoted pawls mounted on the driven member for driving engagement with the drive transmitting member for driving the driven member in one direction and a set of actuating members mounted on the driven member for disengaging the respective pawls in response to rotation in the opposite direction of the control member relative to the driven member.

14 Claims, 6 Drawing Figures

FIG. 2

UNITED STATES PATENT AND TRADEMARK OFFICE
CERTIFICATE OF CORRECTION

PATENT NO. : 4,574,928

DATED : March 11, 1986

INVENTOR(S) : Peter Norton

It is certified that error appears in the above-identified patent and that said Letters Patent is hereby corrected as shown below:

IN THE SPECIFICATION:

Column 1, line 13, delete "392,993" and substitute -- 392,990 --.

Claim 3, column 6, line 25, after "wherein," insert the following paragraph: -- each of said first and second sets of pawls includes more than one pawl. --.

IN THE DRAWINGS:

Sheet 2, Figure 6 is deleted and the attached Figure 6 is substituted therefor.

Signed and Sealed this

Third Day of October, 1989

Attest:

DONALD J. QUIGG

Attesting Officer

Commissioner of Patents and Trademarks